United States Patent [19]

Gall et al.

[11] 4,230,858
[45] Oct. 28, 1980

[54] PERYLENE-3,4,9,10-TETRACARBOXYLIC ACID DIIMIDE PIGMENT, ITS MANUFACTURE AND ITS USE

[75] Inventors: Ludwig Gall, Frankenthal; Wolfgang Fabian, Wilhelmsfeld, both of Fed. Rep. of Germany

[73] Assignee: BASF Aktiengesellschaft, Fed. Rep. of Germany

[21] Appl. No.: 928,874

[22] Filed: Jul. 28, 1978

Related U.S. Application Data

[63] Continuation of Ser. No. 725,852, Sep. 23, 1976, abandoned.

[30] Foreign Application Priority Data

Oct. 16, 1975 [DE] Fed. Rep. of Germany ....... 2546266

[51] Int. Cl.$^3$ ............................................. C07D 471/06
[52] U.S. Cl. ....................................................... 546/37
[58] Field of Search .................... 260/281 P; 546/37

[56] References Cited

U.S. PATENT DOCUMENTS

| | | |
|---|---|---|
| 2,905,685 | 9/1959 | Eckert et al. ................. 260/281 |
| 2,905,686 | 9/1959 | Eckert et al. ................. 260/281 |
| 3,022,299 | 2/1962 | Schmidt et al. ............... 260/281 |
| 3,772,303 | 11/1973 | Spietschka et al. ........... 260/282 |
| 3,974,136 | 8/1976 | Hanger ....................... 106/288 Q |

FOREIGN PATENT DOCUMENTS

| | | |
|---|---|---|
| 1071280 | 12/1959 | Fed. Rep. of Germany ........... 260/281 |
| 1267372 | 1/1960 | France ................................. 260/281 |
| 1202302 | 8/1970 | United Kingdom ..................... 260/281 |

*Primary Examiner*—Mark L. Berch
*Attorney, Agent, or Firm*—Keil & Witherspoon

[57] ABSTRACT

A new pigmentary form of perylene-3,4,9,10-tetracarboxylic acid diimide of the formula

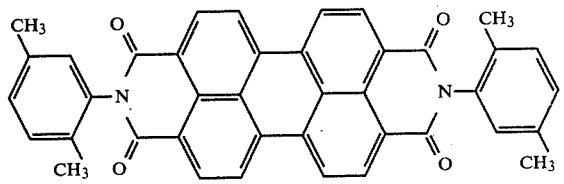

which has a specific surface area (measured by the BET method) of from 5 to 20 m$^2$/g and a maximum in the particle size distribution at from 0.2 to 1$\mu$ in length and from 0.1 to 0.4$\mu$ in width, the mean ratio of length to width being from 4:1 to 1:1, and the proportion of particles between these size limits being at least 50% of the total distribution. The pure shade of the new pigmentary from gives strongly yellowish red colorations which are very pure and very bright. The new pigment also has a good hiding power, which is from 2 to 3 times as great as that of the pigments of the prior art.

3 Claims, No Drawings

PERYLENE-3,4,9,10-TETRACARBOXYLIC ACID DIIMIDE PIGMENT, ITS MANUFACTURE AND ITS USE

This is a continuation of application Ser. No. 725,852 filed Sept. 23, 1976, now abandoned.

German Pat. No. 1,071,280 discloses a perylene-3,4,9,10-tetracarboxylic acid diimide pigment of the formula

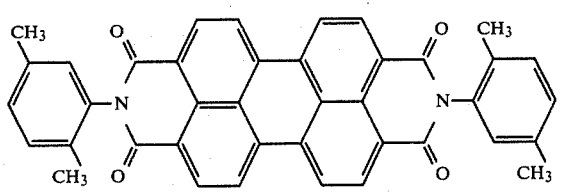

The pigmentary forms obtained using finishing processes of the prior art, e.g. those obtained in accordance with Example 8 of German Published Application 1,104,688, are transparent. They can be used, in conjunction with white pigments, for coloring surface coatings and above all for the mass coloring of plastics, especially of plasticized PVC. The colorations obtained are not very deep and, because of the admixture of the white pigment, have a dull bluish hue.

It is an object of the present invention to provide a pigmentary form of the said colorant—which has a tinctorially interesting hue only in transparent colorations—which, as a full shade, gives colorations of good hiding power which at the same time have a bright and pure hue.

We have found that this object is achieved by a perylene-3,4,9,10-tetracarboxylic acid diimide pigment, having a good hiding power, of the formula

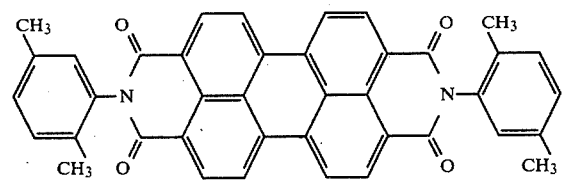

which has a specific surface area, measured by the BET method (BET=St. Brunauer, P. H. Emmet and E. Teller, J. Amer. Chem. Soc. 60, (1938), 309) of from 5 to 20 $m^2/g$, preferably from 8 to 15 $m^2/g$, a maximum in the particle size distribution at from 0.2 to 1 $\mu$, preferably from 0.3 to 0.6$\mu$, in length and of from 0.1 to 0.4$\mu$ in width, the mean ratio of length to width being from 4:1 to 1:1 and the proportion of particles between these size limits being at least 50%, preferably from 70 to 90%, of the total distribution.

The new pigmentary form, as a pure shade, gives strongly yellowish red colorations which have a pure and very bright hue and are clearer and brighter than colorations with the conventional pigmentary forms of the same chemical compound. At the same time, the new pigmentary form is distinguished by a good hiding power, which is from about two to three times that of the pigmentary forms of the prior art.

The new tinctorial properties of the new pigmentary form may also be seen from the reflectance curve in the visible region of the spectrum from 350 to 750 nm, which is employed in the literature for characterizing pigments (cf., for example, Pigment Handbook, Volume III, Characterization and Physical Relationships, John Wiley and Sons, New York 1973, pages 255 to 270).

The new pigmentary form exhibits complete absorption at from 350 to 560 nm, followed by a sharp rise in the reflectance up to a maximum at 650 nm. From the reflection maximum up to the end of the visible region, at 750 nm, over 60% of the incident light are reflected by colorations which contain the new pigmentary form.

The conventional pigmentary forms of the same chemical compound, which consist of smaller or larger primary particles, also shown no reflectance up to 560 nm. However, from this region onward there is a slow rise to the reflection maximum. The reflection of a thick layer of the pigmentary form of the prior art, i.e. of a layer under which the base is no longer visible, is from 40 to 50% of the incident light. This means that the reflectance of the new pigmentary forms is from 20 to 50% higher in the wavelength range of from 650 nm to 750 nm.

The opaque pure shade colorations obtained with the new pigmentary form cannot be obtained by mixing a transparent red pigment with a white pigment. It is true that the white constituent can easily be used to prepare mixtures which have a reflectance of 60% or more at 650 nm. However, such mixtures additionally show partial reflectance in the region of from 400 to 500 nm and a sharp rise in the reflectance from 680 to 750 nm, which shifts the hue of the mixture toward blue. Tinctorially, this blue shift has the adverse effect of manifesting itself as dulling.

The new pigmentary form furthermore exhibits an improvement in lightfastness over the pigmentary forms, of the same chemical structure, of the prior art. This advantage manifests itself particularly in the case of light hues. Thus, for example, a metallic baking finish, prepared using 1 part by weight of the new pigmentary form and 9 parts by weight of aluminum powder, shows virtually no change in hue after 60 days' accelerated light exposure (rating, according to DIN 54,001:8). In contrast, the lightfastness of a metallic finish which contains a pigmentary form of the prior art, of the same chemical compound, is only 6 to 7; the pigmentary form of the prior art was obtained by milling the crude pigment with sodium chloride.

Similar remarks apply to blends with white pigments, e.g. titanium dioxide.

The new pigmentary form is obtained by recrystallizing crude perylene-3,4,9,10-tetracarboxylic acid bis-(2',5'-dimethylphenylimide), in which the primary particles have a size of from 0.05 to 0.1$\mu$ and form agglomerates of from 0.1 to 100$\mu$, in organic fluids, at from 50° to 200° C. until the mean length of the particles is from 0.2 to 1$\mu$, preferably from 0.3 to 0.6$\mu$, the mean width is from 0.1 to 0.4$\mu$, and the proportion of the particles within these limits is at least 50% of the total distribution.

The starting material is obtained from the crude product, resulting from the manufacturing process, by milling, e.g. in ball mills, in the absence of milling assistants, until the milled material essentially consists of primary particles of size from 0.05 to 0.1$\mu$. Since the milling partially destroys the crystalline structure of the particles, the resulting comminuted particles carry high surface charges. For this reason agglomerates of size from 0.1 to 100$\mu$ are formed from the primary particles in the milled material. "Essentially" means, for the purposes of the invention, that at least 60 to 70% of the particles are within the stated size range. The milling time is from 8 to 30 hours, depending on the nature and size of the crystals of the crude product.

Suitable organic fluids are, for example, aliphatic ketones of 3 to 6 carbon atoms, e.g. acetone, methyl ethyl ketone, diethyl ketone, methyl propyl ketone and methyl isobutyl ketone, ethylene glycol, diethylene glycol, ethylene glycol monoalkyl ethers or diethylene glycol monoalkyl ethers, where alkyl is of 1 to 4 carbon atoms, e.g. the monomethyl, monoethyl, monopropyl and/or monobutyl ethers of ethylene glycol and of diethylene glycol, cyclic ethers, e.g. dioxane and tetrahydrofuran, alcohols, e.g. propanol, n-butanol and isobutanol, benzene hydrocarbons, e.g. xylene, toluene and chlorobenzene, or mixtures of these fluids.

For economic reasons, water-miscible alcohols, e.g. n-butanol, isobutanol, ethylene glycol, diethylene glycol, ethylene glycol ethers, e.g. ethylene glycol monomethyl ether and/or diethylene glycol monomethyl ether, ketones, e.g. methyl ethyl ketone and diethyl ketone, or mixtures of these, are preferred organic fluids. Since a particularly valuable pigmentary form is obtained by using ethylene glycol ethers, e.g. diethylene glycol or diethylene glycol monomethyl ether, such ethers are particularly preferred organic fluids.

As a rule, the recrystallization is carried out by introducing the milled material into the solvent, heating the mixture to from 50° to 200° C., preferably from 150° to 180° C., and maintaining it at this temperature, whereupon the finely divided agglomerated crude pigment recrystallizes. The recrystallization has ended when at least 50% of the particles have a size of from 0.2 to 1$\mu$, preferably of from 0.3 to 0.6$\mu$, and their specific surface area is from 5 to 20 m$^2$/g, preferably from 8 to 15 m$^2$/g (measured by the BET method). The recrystallization as a rule requires from 7 to 20 hours, depending on the solvent used and on the temperature.

The recrystallization mixture is then worked up by conventional methods, e.g. by diluting the mixture with water and then filtering off the pigment, or by adding water, distilling off the solvent as an azeotrope, and then isolating the pigment from the aqueous suspension, e.g. by filtering or centrifuging. The water-moist press cake can then be further processed as obtained, or can be dried.

The pigment can also be isolated from an aqueous phase, or, preferably, from an organic phase by freeze drying. In the latter case, the recrystallization is advantageously carried out in a solvent which solidifies at from 0° to 60° C. If this is not the case, the solvent used for the recrystallization is removed and replaced by a solvent suitable for freeze drying, e.g. xylene, benzene or dioxane.

The Examples which follow illustrate the invention. Percentages are by weight.

EXAMPLE (a1) 400 g of N,N'-(Di-2',5'-dimethylphenyl)-perylene-3,4,9,10-tetracarboxylic acid diimide, which has been manufactured by reacting perylene-3,4,9,10-tetracarboxylic acid with 2,5-dimethylaniline, are milled in a cylindrical ball mill of 4 l capacity, with 5 kg of iron balls of from 2 to 2.5 cm diameter, until the size of the primary particles is from 0.05 to 0.1$\mu$. The primary particles form agglomerates of from 1$\mu$ to 100$\mu$ diameter. The previously red pigment powder is converted by milling into a dark brown powder.

(a2) 50 g of the milled material obtained according to (a1), in 150 g of diethylene glycol, are heated for 10 hours at from 170° to 180° C.; after this time, the color has turned light red. The brown milled material has been converted to particles of from 0.2 to 1$\mu$ length. The mixture is then cooled and diluted, at 100° C., with 500 g of water. The pigment is filtered off at from 80° to 90° C. and the filter residue is thoroughly washed with water. The pigment is then dried at 80° C. in a forced ventilation oven. Yield: 48 g of a light red powder. Surface area, measured by the BET method: 13 m$^2$/g.

(b) To determine the tinctorial properties of the pure shade colorations, the pigment obtained was incorporated into a baking finish and into plasticized PVC.

(b1) Full shade coloration (baking finish)

4.5 g of the pigment obtained according to (a2) and 10.5 g of Grinding Base 100 S (manufacturer: Lawter Chemical Inc., Chicago), are weighed into a porcelain dish on an analytical balance, mixed with a spatula and ground on a triple roll mill at 25° C. The mixture is first subjected to three passes under a roll contact pressure of 10 atmospheres and then to six passes under a contact pressure of 80 atmospheres (color paste A).

2 g of color paste A (pigment content 30.0%) are mixed homogeneously with 4 g of a mixture consisting of 70 g of ®Rokraplast SF 501 (manufacturer: Robert Kraemer), 30 g of ®Alkydal S 47 (manufacturer: Bayer AG) and 100 g of ®Cymel 301 (manufacturer: Cyanamid) and 6 drops of a 20% strength solution of p-toluenesulfonic acid in n-butanol, on a glass plate, by means of a spatula. The pigment paste thus obtained is spread over a piece of cardboard, carrying a black-and-white screen pattern, by means of a film spreader, to give a 100$\mu$ thick layer. The coating is air-dried for 2 hours at room temperature and then baked for 45 minutes at 120° C.

A coating having a very bright red hue is obtained. The black-and-white screen pattern of the base is no longer visible.

The coloration was evaluated colorimetrically in accordance with DIN 6,164. The results are shown in the Table below.

(b2) Pure shade coloration in plasticized PVC 3 g of the color paste A obtained according to (b1) are stirred into 47 g of a mixture consisting of 68% of suspension PVC, 25% of bis-3,5,5-trimethylhexyl phthalate, 6% of octyl stearate and 1% of a PVC stabilizer, and the batch is mixed for 60 seconds by means of a high speed stirrer at 3,000 rpm. The mixture is left to stand for 1 hour at room temperature and then for one hour under reduced pressure, to free it from stirred-in air bubbles.

The deaerated PVC color paste is spread by means of a coating knife on a glass strip, to give a 300$\mu$ thick coating. The coatings, set up accurately horizontally, are gelled for 20 minutes at 180° C. in a drying oven.

After they have cooled, areas of size 5×5 cm are marked out in the films by means of a stencil, lifted off the glass plate and then weighed to determine their weight per unit area.

To determine the hiding power, the films obtained are measured spectrophotometrically over a black-and-white contrast base. From the spectral reflectance values over black and white, the pigment concentration per unit area at which the contrast would fall to the threshold value of 1 AN unit, according to DIN 6,174, was calculated, using the Kubelka-Munk theory (i.e., the pigment concentration at which the reflectance and hence the colorations over the white base and over the black base become identical is calculated).

TABLE

Tinctorial properties of the pure shade, measured according to DIN 6,164, of various pigmentary forms of N,N-bis-(2',5'-dimethylphenyl)-3,4,9,10-perylenetetracarboxylic acid diimide, in a baked finish

| Pigment | Hue H | Saturation S | Transparency T | Reflectance at 650 nm (%) | Hiding power ($m^2$/kg) | Particle size ($\mu$) | Visual assessment compared to the full shade coloration according to the invention |
|---|---|---|---|---|---|---|---|
| according to the invention (a2) | 7.31 | 6.25 | 2.739 | 62 | 95 | 0.2–0.5 | |
| A | 7.83 | 5.42 | 3.726 | 42 | low | 0.02–0.05 | bluer, duller, somewhat more transparent |
| B | 6.82 | 5.11 | 3.282 | 33 | low | 0.05–0.1 | browner, substantially more transparent, duller |
| C | 7.42 | 5.90 | 3.018 | 55 | 60 | 10–100 | slightly redder, more transparent, duller |

Pigment A: crude pigment milled without assistants (= a1)
Pigment B: pigment prepared in accordance with Example 5 of German Laid-Open Application DOS 2,013,672
Pigment C: the crude pigment used.

We claim:
1. A perylene-3,4,9,10-tetracarboxylic acid diimide pigment of the formula

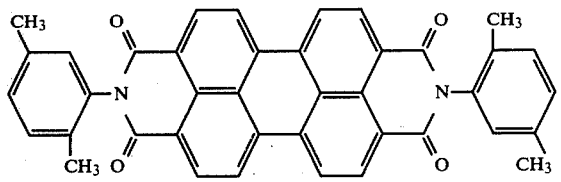

which has a specific surface area, measured by the BET method, of from 5 to 20 $m^2$/g, and is obtained by recrystallization by the steps of mixing crude perylene-3,4,9,10-tetracarboxylic acid bis-(2',5'-dimethylphenylimide) in the form of agglomerates of from 0.1 to 100 microns which consist of primary particles having a size of from 0.05 to 0.1 microns, in organic liquids selected from the group consisting of aliphatic ketones of 3 to 6 carbon atoms, ethylene glycol, diethylene glycol, ethylene glycol monoalkyl ethers, diethylene glycol monoalkyl ethers, where alkyl is of 1 to 4 carbon atoms, dioxane, tetrahydrofuran, propanol, n-butanol, isobutanol and benzene hydrocarbons, heating the mixture from 50° to 200° C., and maintaining the mixture at this temperature for a period from 7 to 20 hours to obtain a pigment which exhibits complete absorption at from 350 to 560 nm, followed by a sharp rise in reflectance up to a maximum at 650 nm.

2. The pigment of claim 1 wherein the organic fluids used are n-butanol, isobutanol, ethylene glycol, diethylene glycol, ethylene glycol monomethyl ether, diethylene glycol monomethyl ether, methyl ethyl ketone, diethyl ketone or mixtures thereof.

3. The pigment of claim 2 wherein the recrystallization is carried out at from 150° to 180° C.